United States Patent [19]
Barthruff et al.

[11] Patent Number: 5,154,097
[45] Date of Patent: Oct. 13, 1992

[54] DAMPING DEVICE FOR A SHAFT HAVING A GEAR WHEEL

[75] Inventors: Otto Barthruff, Stuttgart; Martin Mayer, Sersheim, both of Fed. Rep. of Germany

[73] Assignee: Robert Bosch GmbH, Stuttgart, Fed. Rep. of Germany

[21] Appl. No.: 623,923

[22] PCT Filed: Jun. 1, 1989

[86] PCT No.: PCT/DE89/00351
§ 371 Date: Dec. 18, 1990
§ 102(e) Date: Dec. 18, 1990

[87] PCT Pub. No.: WO89/12767
PCT Pub. Date: Dec. 28, 1989

[30] Foreign Application Priority Data

Jun. 22, 1988 [JP] Japan .................. 3821022

[51] Int. Cl.⁵ ............... F16F 15/22; B25G 3/28
[52] U.S. Cl. ................. 74/573 R; 74/603; 74/595; 403/355; 403/378
[58] Field of Search ........... 74/574, 572, 573 R, 74/595, 597, 603, 604; 403/355, 354, 378, 379

[56] References Cited

U.S. PATENT DOCUMENTS

| | | | |
|---|---|---|---|
| 1,282,571 | 10/1918 | Guay | 74/604 X |
| 2,789,812 | 4/1957 | Ruegg et al. | 74/597 X |
| 4,142,811 | 3/1979 | Burnham | 403/354 X |
| 4,624,597 | 11/1986 | Johnson et al. | 403/355 X |
| 4,767,233 | 8/1988 | Erickson | 403/355 X |
| 5,009,123 | 4/1991 | Hiraoka et al. | 74/597 X |
| 5,018,953 | 5/1991 | Matsubara et al. | 403/355 X |

FOREIGN PATENT DOCUMENTS

| | | | |
|---|---|---|---|
| 614838 | 2/1961 | Canada | 403/379 |
| 366315 | 1/1923 | Fed. Rep. of Germany | 403/379 |
| 437468 | 11/1926 | Fed. Rep. of Germany | 403/355 |
| 689231 | 2/1940 | Fed. Rep. of Germany | 74/595 |
| 1946902 | 3/1971 | Fed. Rep. of Germany | 403/379 |
| 3730728 | 4/1989 | Fed. Rep. of Germany | 403/355 |
| 405025 | 12/1909 | France | 403/355 |
| 551841 | 4/1923 | France | 403/379 |
| 88/01703 | 3/1988 | PCT Int'l Appl. | 74/573 R |
| 144729 | 3/1954 | Sweden | 403/379 |
| 0724820 | 3/1980 | U.S.S.R. | 403/355 |
| 0838105 | 6/1981 | U.S.S.R. | 403/355 |
| 753710 | 7/1956 | United Kingdom | 74/573 R |
| 759215 | 10/1956 | United Kingdom | 74/573 R |
| 2017865 | 10/1979 | United Kingdom | 403/355 |

Primary Examiner—Vinh T. Luong
Attorney, Agent, or Firm—Michael J. Striker

[57] ABSTRACT

A shaft unit, has a shaft having an axis, a gear wheel mounted mounted on the shaft, the gear wheel having a flange and a first bore formed in the flange the shaft having a second bore which is a continuation of the first bore, the first and second bores have the same axis extending perpendicularly to the shaft of the axis and also having the same diameter, and damping device having a spring sleeve composed of elastic material extending in the first and second bore and inserted in the first and second bores in a form-locking fashion between the shaft and the gear wheel, the spring sleeve acting as a force-transmitting and damping member.

1 Claim, 2 Drawing Sheets

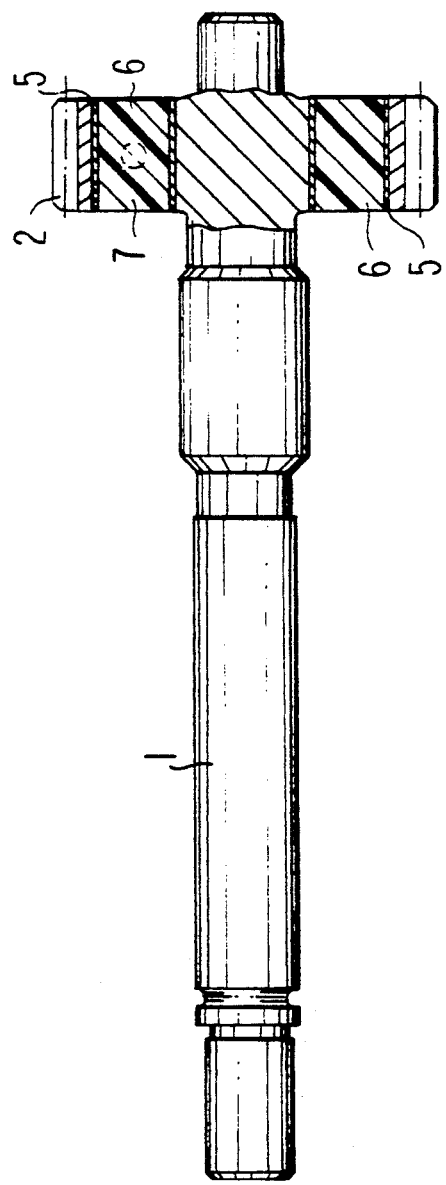
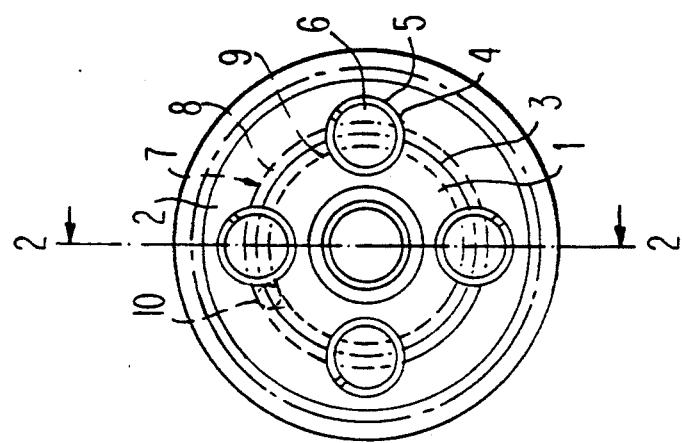

5,154,097

DAMPING DEVICE FOR A SHAFT HAVING A GEAR WHEEL

BACKGROUND OF THE INVENTION

The invention relates to a damping device for a shaft having a gear wheel and comprising a damping member located between the shaft and the gear wheel and acting as a transmission element.

Shafts having one or more gear wheels are known, particularly in gear boxes. The disadvantage of this arrangement is that the impacts or torque peaks acting on the shaft or the gear wheel are transmitted to other elements and can cause damage to the shaft or the gear wheel or to equipment or gearing connected therewith.

SUMMARY OF THE INVENTION

The object of the invention is a damping device in which impacts and/or torque peaks acting on the shaft or the gear wheel are strongly reduced, and damage to the shaft and to the gear wheel, as well as to equipment connected with either, is obviated.

The object of the invention is achieved by providing a damping device which has a spring sleeve into which is set an essentially cylindrical element made of elastic material. This damping device can not only be manufactured very economically, it can also be fitted in a simple manner into a unit consisting of a shaft and a gear wheel.

Particularly preferred is a damping device in which the clamping element can, for the purpose of creating a form-locking connection be fitted into a cut-out recess in the contact surface between the gear wheel and the shaft, where the recess is a bore the axis of which is substantially parallel to the axis of the shaft. This force-locking connection between the gear wheel and the shaft has the advantage that it is very economical with regard to space.

The present invention both as to its construction and its mode of operation, together with additional objects and advantages thereof, will be best understood from the following detailed description of the preferred embodiments when read with reference to the accompanying drawings.

BRIEF DESCRIPTION OF THE DRAWING

FIG. 1 shows a plan view of the front of a shaft to which a gear wheel is fitted with damping means according to the invention;

FIG. 2 shows a partially cross-sectional side view of a unit consisting of a shaft and a gear wheel taken along the line 2—2 in FIG. 1.

DESCRIPTION OF THE PREFERRED EMBODIMENTS

Figure 3:
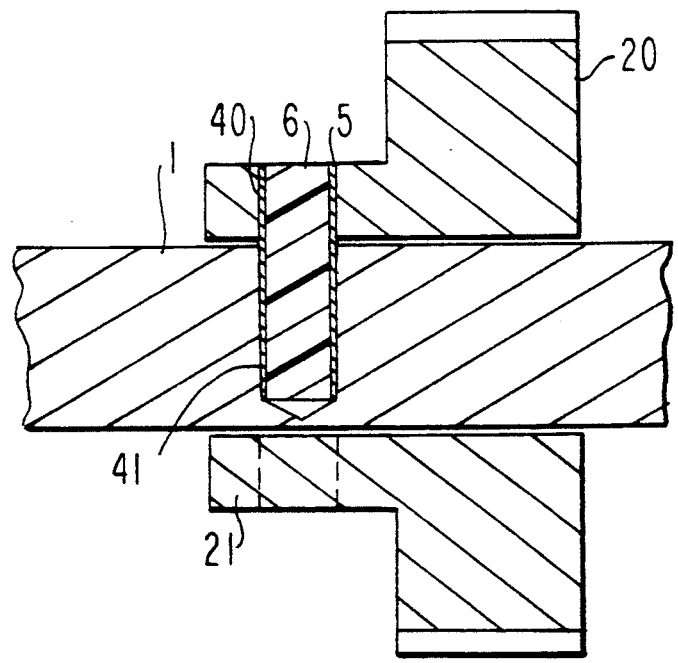
FIG. 3 shows a cross-sectional view of a gear wheel set on a shaft and provided with a flange similar to the view of FIG. 2 but showing another embodiment.

The front view in FIG. 1 shows a gear wheel 2 set on a shaft 1. The contact surface 3 between the gear wheel and the shaft is interrupted by at least one, in this case four circular recesses 4. Into each of the recesses is fitted a spring sleeve 5 into which is pressed a damping element 6 made of elastic material. Extending through the contact surface 3 is a circular channel 7 consisting of a first circular groove 8 formed in the inner surface of the gear wheel 2, and a second circular groove 9 formed in the outer surface of the shaft 1. A ball 10 is introduced in the circular channel 7, the external diameter of which ball correspond approximately to the inner diameter of the circular channel. In this manner an axial displacement of the gear wheel 2 in relation to the shaft 1 is prevented.

The arrangement of the damping members may be seen still more clearly from the cross-sectional view shown in FIG. 2. A gear wheel 2 is pushed or pressed onto the shaft 1 which may be formed in any desired manner and be usable for diverse purposes. A recess 4 is formed in the contact surface between the shaft and the gear wheel, which recess penetrates the material of the shaft as well as the material of the gear wheel. The axis of the recess runs practically parallel to the axis of the shaft. A spring sleeve 5 is inserted in the recess 4, whereby a form-locking connection is created between the gear wheel and the shaft. When a torque is transmitted from the shaft to the gear wheel, or vice-versa, the spring sleeve 5 which is preferably made of flexible material, is compressed somewhat. The substantially cylindrical element 6 made of elastic material and fitted in the spring sleeve is thereby also compressed. The damping member consisting of the spring sleeve and the damping element therefore serves to transmit the load between the shaft and the gear wheel and vice-versa. The impacts and torque peaks are at the same time reduced due to the elasticity of the damping member.

In the embodiment shown in FIG. 3, the action of the damping member is identical. In this case, the gear wheel 20 fitted to a shaft 1 has a flange 21 which is provided with at least one first recess 40 extending perpendicular to the axis of rotation of the gear wheel or to the axis of the shaft. Aligned with this is a second recess 41 in the shaft 1 which may be formed as a perforation or as a blind hole. The damping member is inserted in the recesses 40 and 41 and consists in this case also of a spring sleeve 5 made of a substantially cylindrical damping member 6 made of elastic material. The material of the damping member preferably has a Shore A hardness of 70 to 80. It is readily evident that in this case also the damping member also serves to transmit loads or torques as well as to reduce impacts and torque peaks. Overload of and damage to the shaft and the gear wheel is thereby prevented, as is damage to equipment or gearing connected thereto.

A comparison of FIGS. 2 and 3 shows that the construction in accordance with FIG. 2 is particularly economical with regard to space.

The damping device has been described by an example of a gear wheel fitted to a shaft. It can however also be used at the location of the connection between pulleys and shafts, universal joints, in connecting a sleeve fitted to a shaft, and similar structures.

While the invention has been illustrated and described as embodied in a damping device for a shaft having a gear wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A shaft unit, comprising a shaft having an axis; a gear wheel mounted on the shaft, the gear wheel having a flange and a first bore formed in said flange, the shaft having a second bore which is a continuation of said first bore, said first and second bores having the same axis extending perpendicularly to said shaft of said axis and also having the same diameter; a damping device having a spring sleeve composed of flexible material, extending in the first and second bores and inserted in said first and second bores in a form-locking fashion between the shaft and the gear wheel, said spring sleeve acting as a force-transmitting and damping member; and a substantially cylindrical elastic member arranged in said spring sleeve in a form-locking fashion.

* * * * *